United States Patent [19]

Yasuda et al.

[11] Patent Number: 5,386,124
[45] Date of Patent: Jan. 31, 1995

[54] IMAGE SCANNING APPARATUS

[75] Inventors: Hiroaki Yasuda; Tetsuya Kojima, both of Kanagawa, Japan

[73] Assignee: Fuji Photo Film Co., Ltd., Kanagawa, Japan

[21] Appl. No.: 45,085

[22] Filed: Apr. 12, 1993

[30] Foreign Application Priority Data

Apr. 10, 1992 [JP] Japan .................. 4-090458
Apr. 10, 1992 [JP] Japan .................. 4-090459

[51] Int. Cl.$^6$ .................. G03B 42/02; H01S 3/098
[52] U.S. Cl. .................. 250/585; 372/24
[58] Field of Search .................. 372/24, 28, 82; 250/585

[56] References Cited

U.S. PATENT DOCUMENTS

| 4,258,264 | 3/1981 | Kotera et al. | 250/484.4 |
| 4,480,325 | 10/1984 | Aiki et al. | 372/43 |

FOREIGN PATENT DOCUMENTS

| 56-11395 | 2/1981 | Japan . | |
| 59-9086 | 1/1984 | Japan . | |
| 62-9687 | 1/1987 | Japan | 372/28 |
| 03-163432 | 7/1991 | Japan | 250/585 |

OTHER PUBLICATIONS

English language abstract for Japanese Unexamined Patent Publication No. 56-11395.

*Primary Examiner*—Constantine Hannaher
*Attorney, Agent, or Firm*—Sughrue, Mion, Zinn, Macpeak & Seas

[57] ABSTRACT

In an image scanning apparatus, a recording material is scanned with a laser beam having been produced by a semiconductor laser which oscillates in a single longitudinal mode at any given time such that an image having been recorded on the recording material may be read out therefrom or such that an image may be recorded on the recording material. A single picture element read-out period or a single picture element recording period is defined in accordance with a predetermined picture element clock pulse. A radio-frequency current is superimposed upon a drive current for the semiconductor laser. The radio-frequency current has a frequency, which is higher than the reciprocal of the single picture element read-out period or the reciprocal of the single picture element recording period and which falls within a frequency range that does not cause the semiconductor laser to simultaneously oscillate in multiple longitudinal modes.

6 Claims, 9 Drawing Sheets

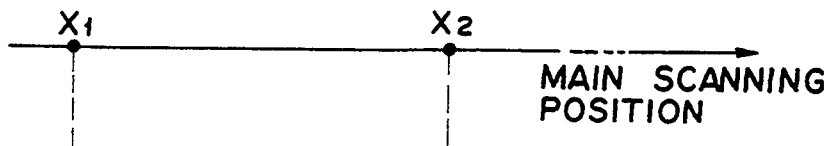
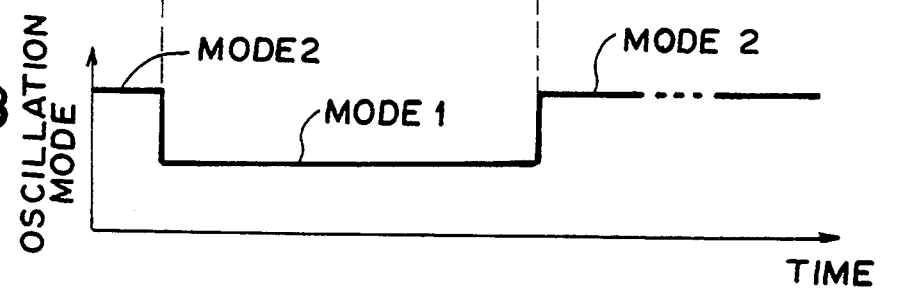
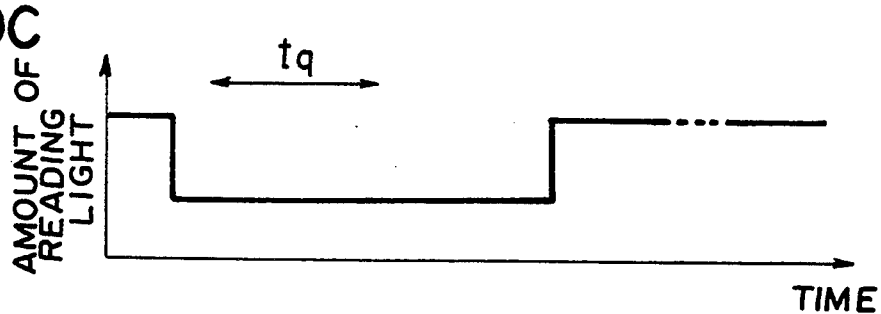
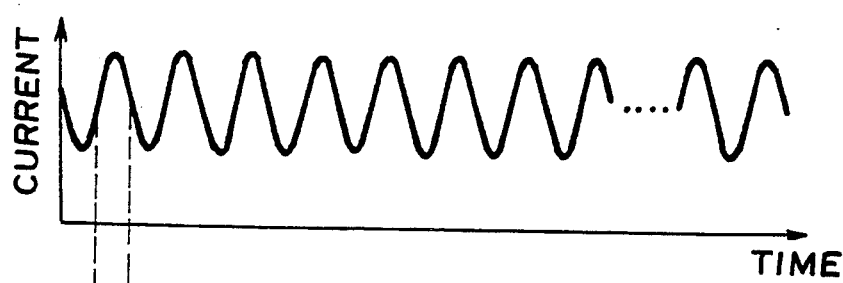
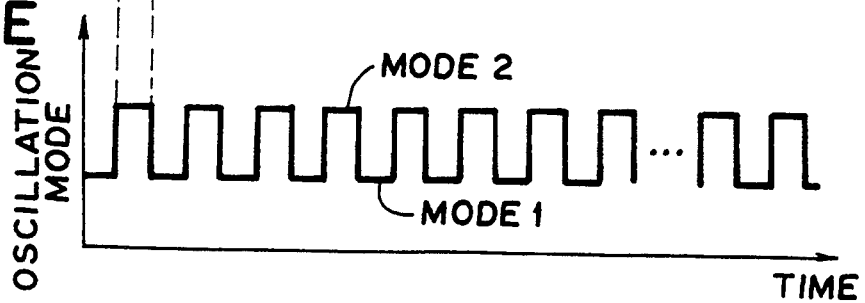

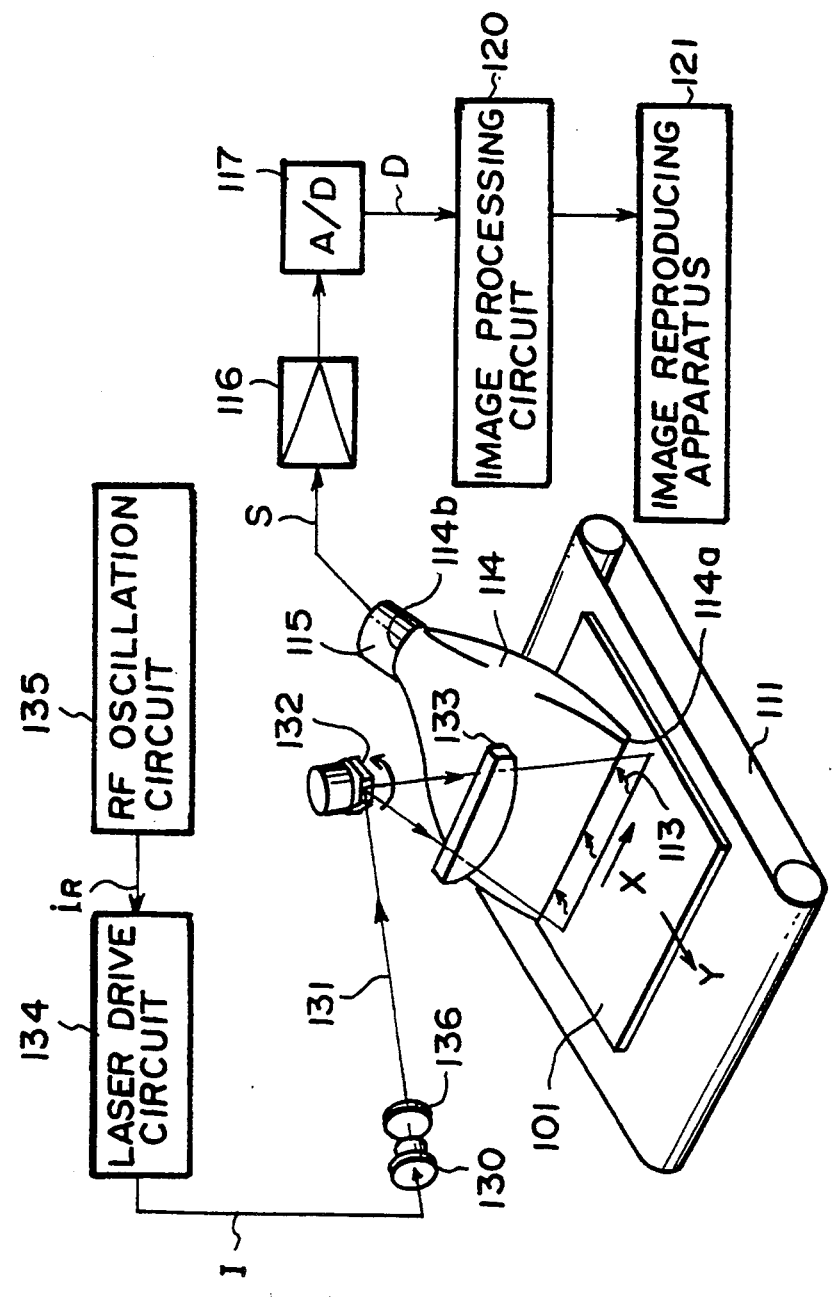

FIG.13A
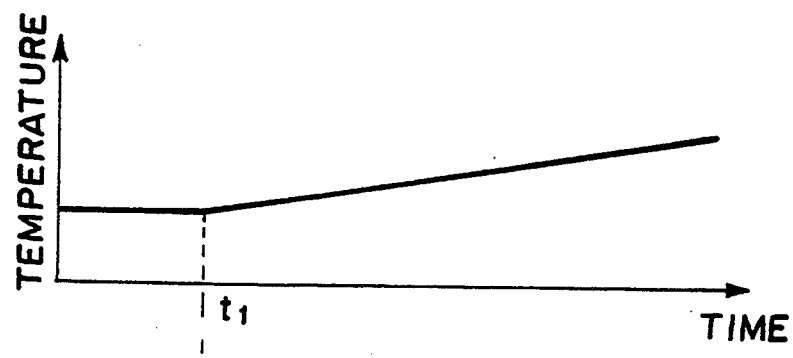
FIG.13B
FIG.13C
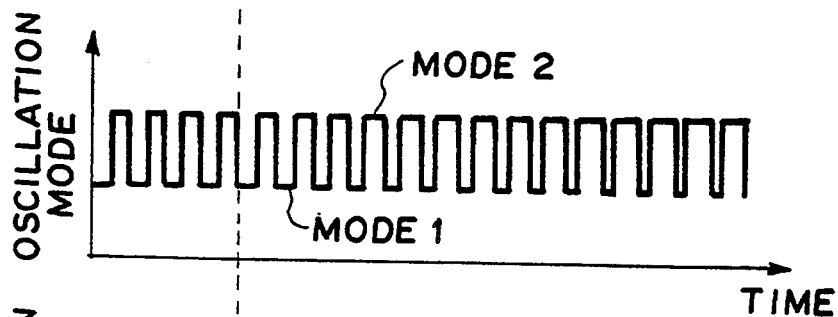
FIG.13D
FIG.13E
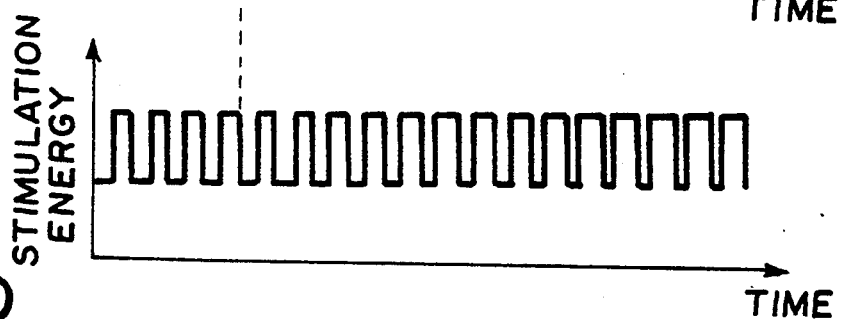

IMAGE SCANNING APPARATUS

BACKGROUND OF THE INVENTION

1. Field of the Invention

This invention relates to an image scanning apparatus, wherein a recording material, such as a photosensitive material, is scanned with a light beam such that an image having been recorded on the recording material may be read out therefrom or such that an image may be recorded on the recording material. This invention particularly relates to an image scanning apparatus, wherein a laser beam produced by a semiconductor laser operating in a single mode at any given time is utilized as the scanning light beam. This invention also relates to a radiation image read-out apparatus for reading out a radiation image by exposing a stimulable phosphor sheet, on which the radiation image has been stored, to stimulating rays, wherein a laser beam produced by a semiconductor laser operating in a single mode at any given time is utilized as the stimulating rays.

2. Description of the Prior Art

Various image read-out apparatuses have heretofore been used wherein a recording material, on which an image has been recorded, is scanned with a light beam which serves as reading light, light radiated out of the portion of the recording material which portion has been exposed to the light beam (i.e. light which has been emitted by the exposed portion of the recording material, light which has passed through the exposed portion of the recording material, or light which has been reflected from the exposed portion of the recording material) is photoelectrically detected, and the recorded image is thereby read out from the recording material. Also, various image recording apparatuses have heretofore been used wherein a light beam, which serves as recording light, is modulated in accordance with an image signal, a recording material (such as a photosensitive material) is scanned with the modulated light beam, and an image represented by the image signal is thereby recorded on the recording material. Ordinarily, in the image read-out apparatus or the image recording apparatus of this type, a single picture element read-out period or a single picture element recording period is defined in accordance with a predetermined picture element clock pulse.

It is considered to utilize semiconductor lasers as scanning light beam sources in image scanning apparatuses for reading out or recording images in the manner described above. A semiconductor laser has various advantages over a gas laser, or the like, in that the semiconductor laser is small in size, cheap and consumes little power. When a semiconductor laser is used in an image scanning apparatus, the image scanning apparatus can be kept compact.

However, it is known that a mode hopping phenomenon occurs with a single-longitudinal-mode semiconductor laser due to a change in the ambient temperature, a change in the drive current, or the like. FIG. 6 shows conditions, under which the mode hopping phenomenon occurs. As illustrated in FIG. 6, the mode of a semiconductor laser is determined by its optical output P and the temperature T. The mode hopping phenomenon occurs at a point at which the mode changes over (e.g., at a point A in FIG. 6). Specifically, in cases where no return light impinges upon the semiconductor laser, the longitudinal mode of the semiconductor laser changes over at random between a mode 1 and a mode 2 at the change-over point A. If the mode hopping phenomenon occurs, the amount of the laser beam produced by the semiconductor laser will fluctuate, or the wavelength of the produced laser beam will fluctuate.

If the mode hopping phenomenon occurs with a semiconductor laser, which is employed as a reading light source in an image read-out apparatus, an image signal, which includes nonuniformity in image density, will be obtained from the image read-out operation. Specifically, for example, as illustrated in FIG. 2, in cases where the recording material, on which an image has been recorded, is a stimulable phosphor sheet described in, for example, U.S. Pat. No. 4,258,264, the sensitivity of the stimulable phosphor sheet depends upon the wavelength of stimulating rays, which cause the sheet to emit light in proportion to the amount of energy stored thereon during its exposure to radiation. (The sensitivity of the stimulable phosphor sheet is defined by the amount of light, which is emitted by the stimulable phosphor sheet, with respect to a predetermined amount of the stimulating rays.) Therefore, if the wavelength of the stimulating rays serving as the reading light fluctuates, even if the amount of the stimulating rays is constant, the amount of light, which is emitted by the stimulable phosphor sheet when it is exposed to the stimulating rays, will fluctuate. Also, in this case, if the amount of light emission of the semiconductor laser fluctuates due to the mode hopping phenomenon, the amount of the stimulating rays itself will fluctuate.

If the mode hopping phenomenon occurs with a semiconductor laser, which is employed as a recording light source in an image recording apparatus, there will be the risk that nonuniformity in image density occurs in a recorded image due to fluctuations in the amount of the recording light and the dependence of the sensitivity of a recording material upon the wavelength of the recording light.

Particularly, in the case of an image read-out apparatus, as illustrated in FIG. 7, it often occurs that an image signal, which includes nonuniformity in image density that appears as vertical stripes U extending in a sub-scanning direction on an image R, is obtained from the image read-out operation. Studies carried out by the inventors revealed that the nonuniformity in image density appearing as the vertical stripes U is also caused by the mode hopping phenomenon of a semiconductor laser.

A method for coping with the mode hopping phenomenon has been proposed in, for example, Japanese Examined Patent Publication No. 59(1984)-9086. With the proposed method, a radio-frequency current is superimposed upon a drive current for a semiconductor laser, and the single-longitudinal-mode semiconductor laser is thereby caused to oscillate in a multiple longitudinal mode.

However, in such cases, the frequency of the radio-frequency current must be very high and ordinarily on the order of more than 50MHz. A circuit for generating a radio-frequency current having such a markedly high frequency is very expensive. Therefore, if the conventional technique for superimposing a radio-frequency current upon a drive current for a semiconductor laser is applied to an image scanning apparatus, the cost of the image scanning apparatus cannot be kept low.

Also, when the radio-frequency current as described above is used, a high level of radiation noise occurs, and various powerful electromagnetic shields must be used in order to avoid adverse effects of radiation noise. The use of such powerful electromagnetic shields also causes the cost of the image scanning apparatus to become high.

SUMMARY OF THE INVENTION

The primary object of the present invention is to provide an image scanning apparatus, wherein a semiconductor laser operating in a single mode at any given time is employed as a scanning light beam source such that an image signal, which does not include nonuniformity in image density, may be obtained from an image read-out operation when the image scanning apparatus is used to read out an image, or such that nonuniformity in image density may not occur in a recorded image when the image scanning apparatus is used to record the image, and wherein the cost of the image scanning apparatus does not become markedly high due to countermeasures for nonuniformity in image density.

Another object of the present invention is to provide a radiation image read-out apparatus, wherein a semiconductor laser operating in a single-longitudinal-mode at any given time is employed as a stimulating ray source such that an image signal, which does not include nonuniformity in image density, may be obtained from an image read-out operation, and wherein the cost of the radiation image read-out apparatus does not become markedly high due to countermeasures for nonuniformity in image density.

The present invention provides an image scanning apparatus, in which a recording material is scanned with a laser beam having been produced by a semiconductor laser operating in a single-longitudinal-mode at any given time such that an image having been recorded on the recording material may be read out therefrom or such that an image may be recorded on the recording material, and in which a single picture element read-out period or a single picture element recording period is defined in accordance with a predetermined picture element clock pulse, wherein the improvement comprises the provision of a means for superimposing a radio-frequency current upon a drive current for the semiconductor laser, the radio-frequency current having a frequency, which is higher than the reciprocal of the single picture element read-out period or the reciprocal of the single picture element recording period and which falls within a frequency range that does not cause the semiconductor laser to simultaneously oscillate in a plurality of longitudinal modes.

As the radio-frequency current, a square-wave current having a duty ratio of 60% or more should preferably be used. The reasons for this will be described later.

With the image scanning apparatus in accordance with the present invention, the semiconductor laser does not simultaneously oscillate a plurality of multiple longitudinal modes, but is driven such that the mode changes over repeatedly between different single longitudinal modes. Regardless of such a drive state, nonuniformity in image density due to the mode hopping phenomenon becomes imperceptible. With respect to how the nonuniformity in image density can be prevented from occurring, three effects are considered. First effects will be described hereinbelow with reference to FIGS. 3A, 3B, 3C, and 3D and FIGS. 4A, 4B, 4C, and 4D by taking an image recording operation as an example.

FIGS. 3A, 3B, 3C, and 3D are graphs showing the relationships among a temperature of a semiconductor laser, an oscillation mode of the semiconductor laser, an amount of recording light before being modulated, and a picture element clock pulse in a conventional image recording apparatus. In this case, no radio-frequency current is superimposed upon the drive current for the semiconductor laser. By way of example, as illustrated in FIG. 3A, the temperature of the semiconductor laser begins to rise at a time t1. Also, as illustrated in FIG. 3B, the longitudinal mode of the semiconductor laser hops at a time t2 from a mode 1 to a mode 2. As illustrated in FIG. 3C, in cases where the laser beam produced by the semiconductor laser is modulated with an external signal and an image is thereby recorded on a recording material, the amount of the recording light before being modulated changes stepwise due to the mode hopping phenomenon. A single picture element recording period tp is defined as shown in FIG. 3C in accordance with a picture element clock pulse C illustrated in FIG. 3D. In such cases, even if the levels of an image signal (i.e. a modulation instructing signal) for the respective picture elements defined by picture element clock pulses Cn-1 and Cn are identical with each other, a step-like difference in image density will occur between the picture elements due to the difference in the amount of the recording light before being modulated.

FIGS. 4A, 4B, 4C, and 4D are graphs showing the relationships among a temperature of a semiconductor laser, an oscillation mode of the semiconductor laser, an amount of recording light before being modulated, and a picture element clock pulse in the image recording apparatus in accordance with the present invention. In cases where a radio-frequency current, which has a frequency higher than the reciprocal of the single picture element recording period tp, is superimposed upon the drive current for the semiconductor laser, the oscillation mode changes over alternately as illustrated in FIG. 4B. In such cases, when the temperature of the semiconductor laser begins to rise at the time t1 as illustrated in FIG. 4A, the duty ratio of the mode 2 increases little by little. Therefore, as illustrated in FIG. 4C, the amount of the recording light before being modulated changes in a pulsed pattern in accordance with the changeover of the longitudinal mode. Also, as illustrated in FIG. 4C, the mean amount of the recording light before being modulated increases little by little as indicated by the imaginary line in accordance with the change in the duty ratio.

Therefore, in such cases, when the single picture element recording period tp is defined in accordance with the picture element clock pulse C illustrated in FIG. 4D, a large step-like difference in image density does not occur between the picture element, which is defined by the clock pulse Cn-1, and the picture element, which is defined by the clock pulse Cn. In the case of an image read-out operation, in the same manner as that described above, an image signal, which does not include nonuniformity in image density due to the mode hopping phenomenon, can be obtained from the image read-out operation.

Second effects of preventing the nonuniformity in image density from occurring will be described hereinbelow. Particularly, with the second effects, the vertical stripes U described above are prevented from occurring. The second effects are obtained also when the radio-frequency current has a wave form other than a sine wave. By way of example, how the second effects are obtained in a radiation image read-out apparatus for reading out a radiation image from a stimulable phosphor sheet will be described hereinbelow. As illustrated in FIG. 8, in the radiation image read-out apparatus, a laser beam 131 serving as the stimulating rays, which cause a stimulable phosphor sheet to emit light in proportion to the amount of energy stored thereon during its exposure to radiation, is produced as a divergent beam by a single-longitudinal-mode semiconductor laser 130. The laser beam 131 is collimated by a collimator lens 136 and reflected and deflected by a light deflector 132, such as a rotating polygon mirror. The laser beam 131 is then condensed by a scanning lens 133 and caused to scan a stimulable phosphor sheet 101. When the stimulable phosphor sheet 101 is exposed to the laser beam 131, the exposed portion emits light (not shown) in an amount proportional to the amount of energy stored thereon during its exposure to the radiation. The emitted light is photoelectrically detected, and an image signal representing the radiation image is thereby obtained.

In cases where the stimulable phosphor sheet 101 is scanned with the laser beam 131 in the manner described above, comparatively strong return light (i.e. light having been reflected by the stimulable phosphor sheet 101 and returning to the semiconductor laser 130) occurs. Therefore, if no radio-frequency current is superimposed upon the drive current for the semiconductor laser 130, the mode of the semiconductor laser 130 will depend upon the distance from the semiconductor laser 130 to the position on the stimulable phosphor sheet 101 at which the laser beam 131 converges. Specifically, for example, when the laser beam 131 impinges upon a point X1 located on a main scanning line, the semiconductor laser 130 is apt to oscillate in a mode 1 due to the return light. When the laser beam 131 impinges upon a different point X2 located on the main scanning line, the semiconductor laser 130 is apt to oscillate in a different mode 2 due to the return light. Such a phenomenon can be understood from FIGS. 9A, 9B, 9C, 9D, and 9E. FIGS. 9A, 9B, 9C, 9D, and 9E are graphs showing examples of the relationships among a main scanning position of reading light in an image read-out apparatus, a longitudinal mode of a semiconductor laser driven with a drive current upon which no radio-frequency current has been superimposed, an amount of reading light produced by the semiconductor laser, a wave form of a radio-frequency current, and a longitudinal mode of the semiconductor laser driven with a drive current upon which the radio-frequency current has been superimposed. FIG. 9A shows the main scanning position, and FIG. 9B shows the longitudinal mode corresponding to the main scanning position.

When the longitudinal mode of the semiconductor laser 130 changes as shown in FIG. 9B, the amount of the reading light, i.e. the amount of the stimulating rays, varies in the pattern shown in FIG. 9C. Therefore, the amount of light, which is emitted by the stimulable phosphor sheet 101 when it is exposed to the stimulating rays, changes. Such a change in the amount of emitted light appears as a change in image density in an image signal obtained from the image read-out operation. Ordinarily, the changeover in the longitudinal mode depending upon the return light occurs at time intervals longer than a single picture element read-out period tq.

Therefore, a clear change in image density occurs over several picture elements. Also, the chageover in the longitudinal mode depending upon the return light occurs at the same main scanning position of the laser beam during every main scanning step. As a result, the nonuniformity in image density due to the changeover in the longitudinal mode stands in a row along the sub-scanning direction, and the aforesaid vertical stripes U thereby occur.

On the other hand, in cases where the radio-frequency current, which has a frequency higher than the reciprocal of the single picture element read-out period tq, is superimposed upon the drive current for the semiconductor laser 130 as illustrated in FIG. 9D, the optical output P of the semiconductor laser 130 changes, for example, between points B and C shown in FIG. 6, and the longitudinal mode of the semiconductor laser 130 changes over as shown in FIG. 9E. The changeover in the longitudinal mode occurs frequently at time intervals shorter than the single picture element read-out period tq, and therefore becomes uniform for every picture element. Specifically, the changeover in the longitudinal mode does not appear as a change in image density between picture elements, and therefore the aforesaid vertical stripes U do not occur.

The second effects described above are obtained in the same manner also when the wave form of the radio-frequency current is a square wave. In such cases, when the optical output P of the semiconductor laser 130 changes between the points B and C shown in FIG. 6 due to the superimposition of the radio-frequency current upon the drive current for the semiconductor laser 130, the longitudinal mode of the semiconductor laser 130 changes over as shown in FIG. 9E, i.e. in the same pattern as the wave form of the radio-frequency current.

Specific cases of the second effects of preventing the nonuniformity in image density from occurring will be described hereinbelow by taking the radiation image read-out apparatus shown in FIG. 8 as an example. FIGS. 10A, 10B, 10C, 10D, and 10E are graphs showing different examples of the relationships among a main scanning position of reading light in an image read-out apparatus, a longitudinal mode of a semiconductor laser driven with a drive current upon which no radio-frequency current has been superimposed, an amount of reading light produced by the semiconductor laser, a wave form of a radio-frequency current, and a longitudinal mode of the semiconductor laser driven with a drive current upon which the radio-frequency current has been superimposed. As described above with reference to FIGS. 9A, 9B, and 9C, if no radio-frequency current is superimposed upon the drive current for the semiconductor laser 130, as shown in FIGS. 10A, 10B, and 10C, the longitudinal mode of the semiconductor laser 130 will change at the main scanning positions X1 and X2, and the amount of the reading light will change in accordance with the change in the longitudinal mode.

On the other hand, it is considered that a radio-frequency current having a square wave form shown in FIG. 10D is superimposed upon the drive current for the semiconductor laser 130. In such cases, as a specific state, it may occur that the optical output P of the semiconductor laser 130 changes between the points A and B shown in FIG. 6 due to the superimposition of the radio-frequency current upon the drive current for the semiconductor laser 130. In such a state, before the main scanning position of the laser beam 131 reaches the point X2, the longitudinal mode of the semiconductor laser 130 can become either one of the mode 1 and the mode 2. In this case, as illustrated in FIG. 10E, it is assumed that the longitudinal mode coincides with the mode 1 before the main scanning position of the laser beam 131 reaches the point X2.

When the main scanning position of the laser beam 131 reaches the point X2, the longitudinal mode changes over to the mode 2 due to the effects of the return light. However, as is clear from FIGS. 10D and 10E, because the radio-frequency current is superimposed upon the drive current for the semiconductor laser 130, the optical output P of the semiconductor laser 130 decreases immediately to the point B shown in FIG. 6, and the semiconductor laser 130 becomes apt to oscillate in the mode 1. Therefore, the longitudinal mode changes over to the mode 2 only during a period t3, which is shorter than the single picture element read-out period tq, and then returns to the mode 1. In the manner described above, the vertical stripes U do not occur due to the mode hopping phenomenon of the semiconductor laser 130.

The second effects described above are obtained markedly in an image read-out apparatus wherein light returning from the recording material occurs easily. The second effects can also be obtained in the same manner in an image recording apparatus when comparatively strong return light occurs easily.

As described above, the second effects described above can be obtained also when the radio-frequency current is of a square wave. In cases where the square-wave radio-frequency current is utilized, if its duty ratio tA/t shown in FIG. 10D is set at a large value, the amount of light can be obtained more efficiently than when a sine-wave radio-frequency current is utilized. Therefore, it becomes possible for a semiconductor laser having a smaller maximum output to be utilized. From such a point of view, in general, the duty ratio should preferably be set at 60% or more.

As described above, with the image scanning apparatus in accordance with the present invention, the superimposition of the radio-frequency current may be carried out such that it may merely cause the longitudinal mode to change over. Therefore, the degree of modulation V (=amplitude A / maximum current p, shown in FIG. 5) of the drive current for the semiconductor laser due to the superimposition of the radio-frequency current need not necessarily be set at a high level of approximately 100% as in cases where a semiconductor laser is caused to oscillate in a multiple longitudinal mode. For example, the degree of modulation V can be set at 40% or less.

The changeover of the longitudinal mode by the superimposition of the radio-frequency current should preferably be carried out two times or more within the single picture element read-out period or within the single picture element recording period. For this purpose, for example, when the single picture element read-out period is 1 $\mu$sec, the frequency of the radio-frequency current is at least 2 MHz or more. When the single picture element recording period is 500 nsec, the frequency of the radio-frequency current is at least 4 MHz or more. Also, in general, the frequency range of the radio-frequency current that does not cause the semiconductor laser to oscillate in a multiple longitudinal mode is a range lower than approximately 50 MHz.

In cases where the frequency of the radio-frequency current superimposed upon the drive current for the semiconductor laser takes the value described above, the circuit for processing the radio-frequency current may be constituted of logic IC's, such as TTL or C-MOS, which are used widely. Therefore, the cost of the circuit can be kept comparatively lower than when a radio-frequency current having a very high frequency is utilized to cause the semiconductor laser to simultaneously oscillate in multiple longitudinal modes. Also, with the image scanning apparatus in accordance with the present invention, wherein the radio-frequency current is utilized which has a frequency not so much high as the frequency in a conventional image scanning apparatus, it is sufficient that comparatively simple electromagnetic shields are used to avoid adverse effects of radiation noise. By virtue of these two features, the cost of the image scanning apparatus in accordance with the present invention can be kept lower than a conventional image scanning apparatus, wherein a semiconductor laser is caused to simultaneously oscillate in multiple longitudinal modes for the purposes of coping with nonuniformity in image density due to the mode hopping phenomenon.

The present invention also provides a radiation image read-out apparatus for two-dimensionally scanning a stimulable phosphor sheet, on which a radiation image has been stored, with stimulating rays, which cause the stimulable phosphor sheet to emit light in proportion to the amount of energy stored thereon during its exposure to radiation, and detecting the emitted light with a photodetector, the radiation image being thereby read out, wherein the improvement comprises the provision of:

i) a semiconductor laser oscillating in a single longitudinal mode at any given time, which serves as a source for producing the stimulating rays, and ii) a means for superimposing a radio-frequency current upon a drive current for the semiconductor laser, the radio-frequency current having a frequency, which is higher than the reciprocal of a delay time of light emission response of the stimulable phosphor sheet and which falls within a frequency range that does not cause the semiconductor laser to simultaneously oscillate in multiple longitudinal modes.

When certain kinds of phosphors are exposed to radiation such as X-rays, $\alpha$-rays, $\beta$-rays, $\gamma$-rays, cathode rays or ultraviolet rays, they store part of the energy of the radiation. Then, when the phosphor which has been exposed to the radiation is exposed to stimulating rays, such as visible light, light is emitted by the phosphor in proportion to the amount of energy stored thereon during its exposure to the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then scanned two-dimensionally with stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an image signal. The image signal is then used during the reproduction of the radiation image of the object as a visible image on a recording material such as photographic film, on a display device such as a cathode ray tube (CRT), or the like.

With the radiation image read-out apparatus in accordance with the present invention, the semiconductor laser does not simultaneously oscillate in multiple longitudinal modes, but is driven such that the mode changes over repeatedly between different single longitudinal modes. Regardless of such a drive state, nonuniformity in image density due to the mode hopping phenomenon becomes imperceptible. How the nonuniformity in image density can be prevented from occurring will be described hereinbelow with reference to FIGS. 12A, 12B, 12C, 12D, and 12E and FIGS. 13A, 13B, 13C, 13D, and 13E.

FIGS. 12A, 12B, 12C, 12D, and 12E are graphs showing the relationships among a temperature of a semiconductor laser, an oscillation mode of the semiconductor laser, stimulation energy for a stimulable phosphor sheet, a light emission amount detecting signal, and a picture element clock pulse for sampling an image signal in a conventional radiation image read-out apparatus. In this case, no radio-frequency current is superimposed upon the drive current for the semiconductor laser. By way of example, as illustrated in FIG. 12A, the temperature of the semiconductor laser begins to rise at a time t1. Also, as illustrated in FIG. 12B, the longitudinal mode of the semiconductor laser hops at a time t2 from a mode 1 to a mode 2. As illustrated in FIG. 12C, the level of the stimulation energy, which the stimulable phosphor sheet receives during the scanning with the stimulating rays, changes stepwise due to the mode hopping phenomenon. In this case, the stimulation energy is the effective stimulation energy, which is defined by considering a change in the amount of the stimulating rays and the dependence of the sensitivity of the stimulable phosphor sheet upon the wavelength of the stimulating rays as shown in FIG. 2. If the level of the stimulation energy changes in this manner, the amount of light emitted by the stimulable phosphor sheet, i.e. the level of the light emission amount detecting signal S, changes in the pattern shown in FIG. 12D. (As an aid in facilitating the explanation, it is assumed that energy is uniformly stored on the stimulable phosphor sheet during its exposure to radiation.)

The response of the change in the amount of light emitted by the stimulable phosphor sheet delays behind the change in the level of the stimulation energy. For ordinary stimulable phosphor sheets, the delay time of light emission response is approximately 1 $\mu$sec. The light emission amount detecting signal S is sampled in accordance with picture element clock pulses C, and image signal components corresponding to respective picture elements in the radiation image are thereby obtained. In cases where the picture element clock pulses C are defined as shown in FIG. 12E (ordinarily, their period is several microseconds), a step-like difference in image density will occur between a picture element, which corresponds to an image signal component sampled with a clock pulse Cn-1 or a preceding clock pulse, and a picture element, which corresponds to an image signal component sampled with a clock pulse Cn or a clock pulse that follows.

FIGS. 13A, 13B, 13C, 13D, and 13E are graphs showing the relationships among a temperature of a semiconductor laser, an oscillation mode of the semiconductor laser, stimulation energy for a stimulable phosphor sheet, a light emission amount detecting signal, and a picture element clock pulse for sampling an image signal in the radiation image read-out apparatus in accordance with the present invention. In cases where a radio-frequency current, which has a frequency higher than the reciprocal of the delay time of the light emission response, is superimposed upon the drive current for the semiconductor laser, the oscillation mode changes over alternately as illustrated in FIG. 13B. In such cases, when the temperature of the semiconductor laser begins to rise at the time t1 as illustrated in FIG. 13A, the duty ratio of the mode 2 increases little by little. Therefore, as illustrated in FIG. 13C, the level of the stimulation energy, which the stimulable phosphor sheet receives, changes in a pulsed pattern in accordance with the changeover of the longitudinal mode. However, the stimulable phosphor sheet has the delay in response as described above, and therefore the amount of light emitted by the stimulable phosphor sheet, i.e. the level of the light emission amount detecting signal S, does not change in the pulsed pattern, and increases little by little as shown in FIG. 13D in accordance with the change in the duty ratio.

Therefore, in such cases, when the light emission amount detecting signal S is sampled in accordance with the picture element clock pulses C illustrated in FIG. 13E, a large step-like difference in image density does not occur between the picture element, which corresponds to the image signal component sampled with the clock pulse Cn-1 or a preceding clock pulse, and the picture element, which corresponds to the image signal component sampled with the clock pulse Cn or a clock pulse that follows.

As described above, ordinarily, the delay time of the light emission response of the stimulable phosphor sheet is approximately 1 $\mu$sec. When such a stimulable phosphor sheet is used, the frequency of the radio-frequency current may be set at a value higher than 1 MHz. Also, in general, the frequency range of the radio-frequency current that does not cause the semiconductor laser to simultaneously oscillate in multiple longitudinal modes is a range lower than approximately 50 MHz.

In cases where the frequency of the radio-frequency current superimposed upon the drive current for the semiconductor laser takes the value described above, the circuit for processing the radio-frequency current may be constituted of logic IC's, such as TTL or C-MOS, which are used widely. Therefore, the cost of the circuit can be kept comparatively lower than when a radio-frequency current having a very high frequency is utilized to simultaneously cause the semiconductor laser to oscillate in multiple longitudinal modes. Also, with the radiation image read-out apparatus in accordance with the present invention, wherein the radio-frequency current is utilized which has a frequency not so much high as the frequency in a conventional radiation image read-out apparatus, it is sufficient that comparatively simple electromagnetic shields are used to avoid adverse effects of radiation noise. By virtue of these two features, the cost of the radiation image read-out apparatus in accordance with the present invention can be kept lower than a conventional radiation image read-out apparatus, wherein a semiconductor laser is caused to simultaneously oscillate in multiple longitudinal modes for the purposes of coping with nonuniformity in image density due to the mode hopping phenomenon.

BRIEF DESCRIPTION OF THE DRAWINGS

FIGS. 9A, 9B, 9C, 9D, and 9E are graphs showing examples of the relationships among a main scanning position of reading light in an image read-out apparatus, a longitudinal mode of a semiconductor laser driven with a drive current upon which no radio-frequency current has been superimposed, an amount of reading light produced by the semiconductor laser, a wave form of a radio-frequency current, and a longitudinal mode of the semiconductor laser driven with a drive current upon which the radio-frequency current has been superimposed, FIG. 11 is a schematic perspective view showing a second embodiment of the image scanning apparatus in accordance with the present invention, FIGS. 13A, 13B, 13C, 13D, and 13E are graphs showing the relationships among a temperature of a semiconductor laser, an oscillation mode of the semiconductor laser, stimulation energy for a stimulable phosphor sheet, a light emission amount detecting signal, and a picture element clock pulse for sampling an image signal in the radiation image read-out apparatus in accordance with the present invention.

DESCRIPTION OF THE PREFERRED EMBODIMENTS

The present invention will hereinbelow be described in further detail with reference to the accompanying drawings.

Figure 1:
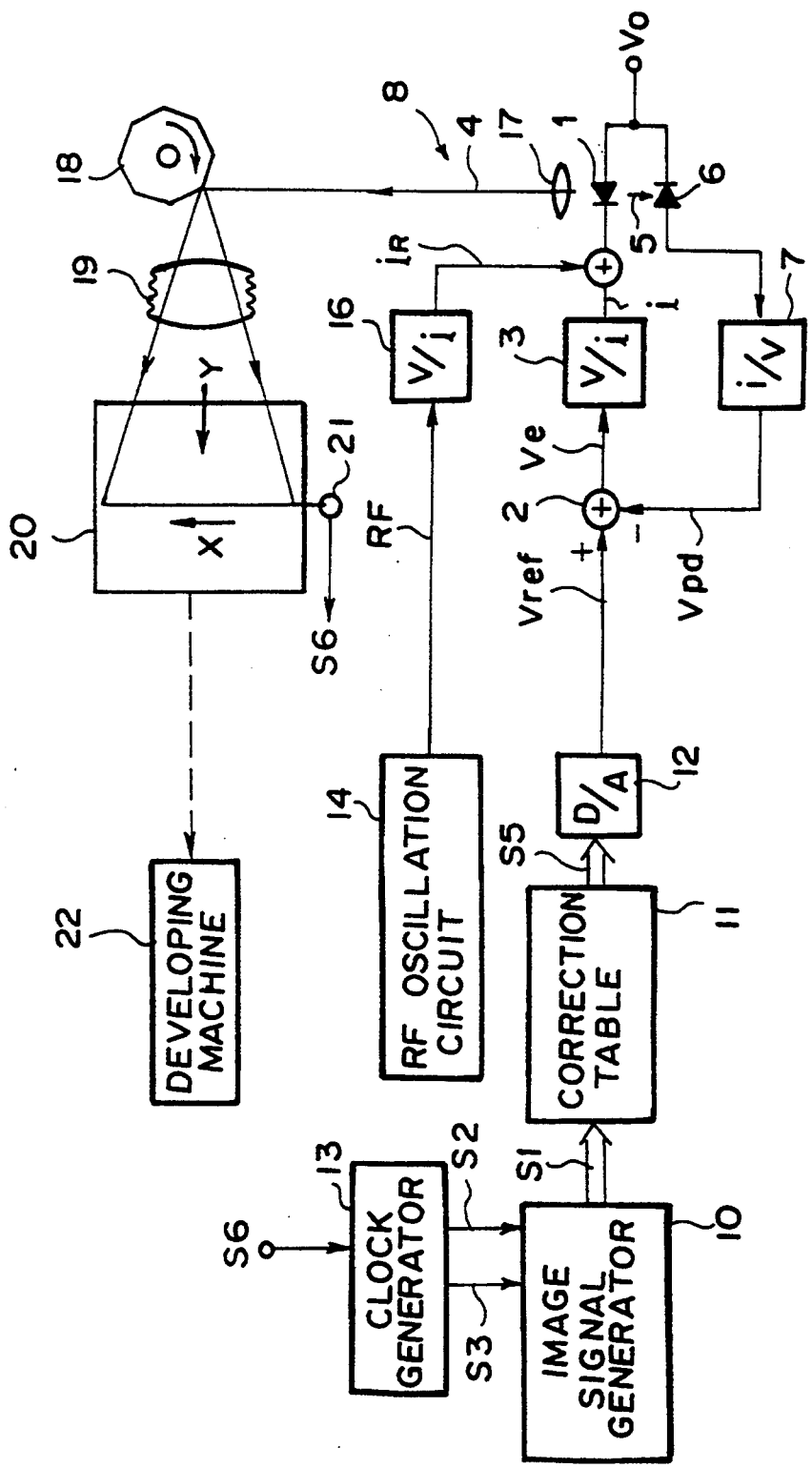
FIG. 1 is a schematic view showing a first embodiment of the image scanning apparatus in accordance with the present invention.
Figure 2:
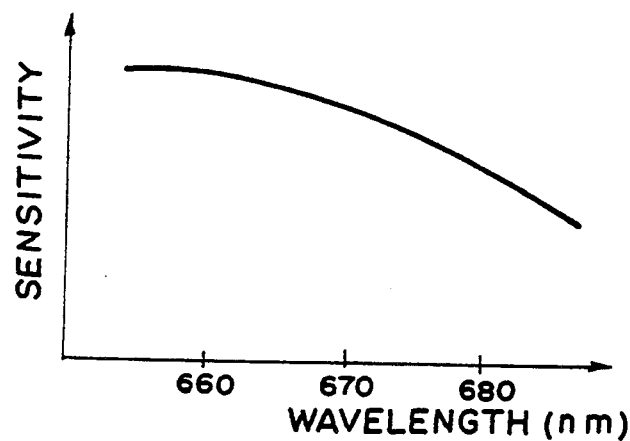
FIG. 2 is a graph showing an example of spectral sensitivity characteristics of a stimulable phosphor sheet.
Figure 3A:
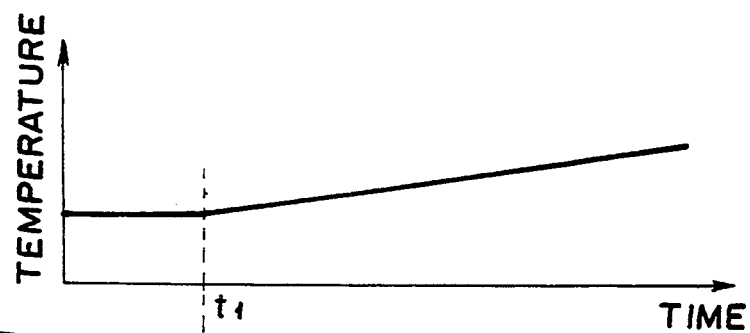
FIGS. 3A, 3B, 3C, and 3D are graphs showing the relationships among a temperature of a semiconductor laser, an oscillation mode of the semiconductor laser, an amount of recording light before being modulated, and a picture element clock pulse in a conventional image recording apparatus.
Figure 3B:
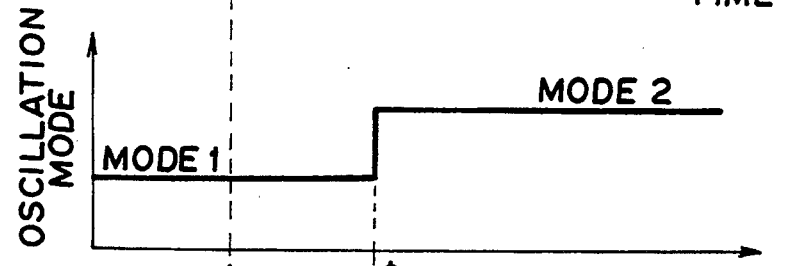
Figure 3C:
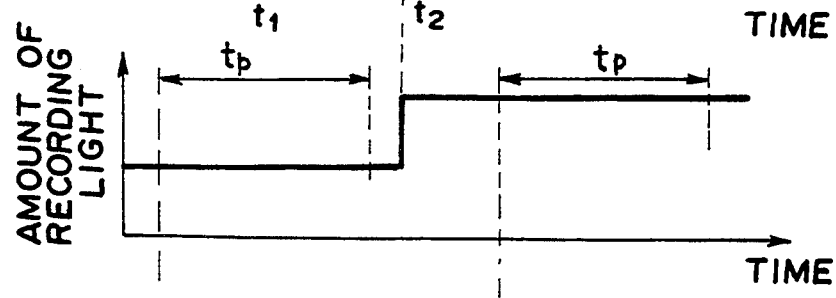
Figure 3D:
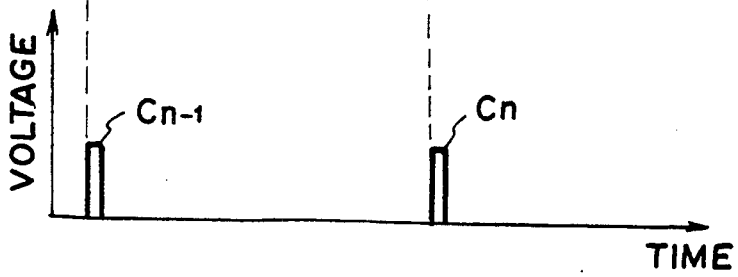
Figure 4A:
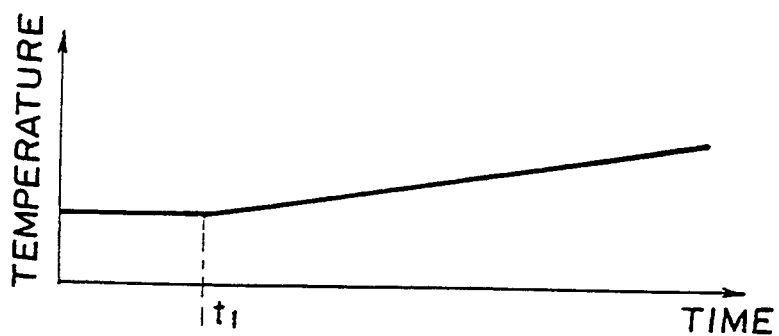
FIGS. 4A, 4B, 4C, and 4D are graphs showing the relationships among a temperature of a semiconductor laser, an oscillation mode of the semiconductor laser, an amount of recording light before being modulated, and a picture element clock pulse in the image recording apparatus in accordance with the present invention.
Figure 4B:
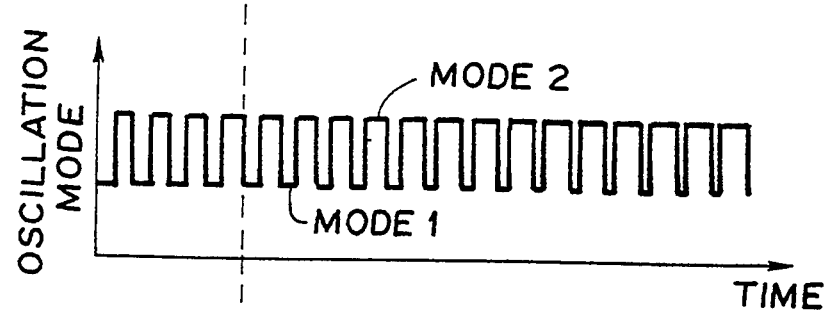
Figure 4C:
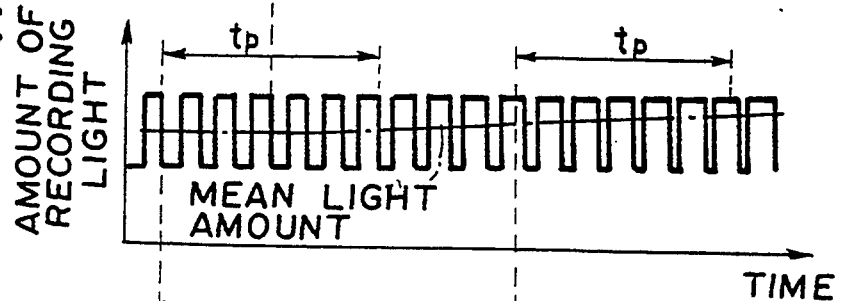
Figure 4D:
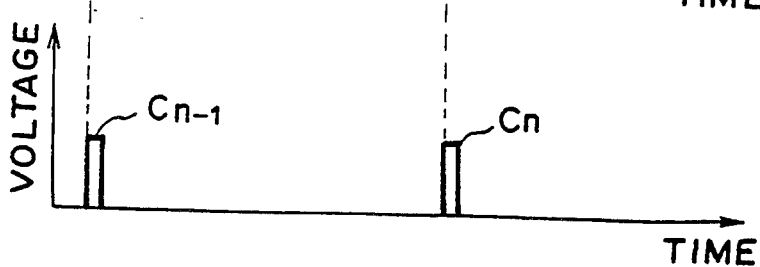
Figure 5:
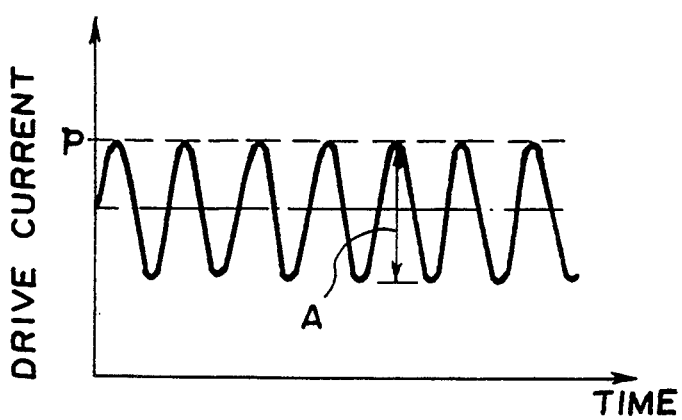
FIG. 5 is a graph showing the degree of modulation of a drive current for a semiconductor laser in the image scanning apparatus in accordance with the present invention.
Figure 6:
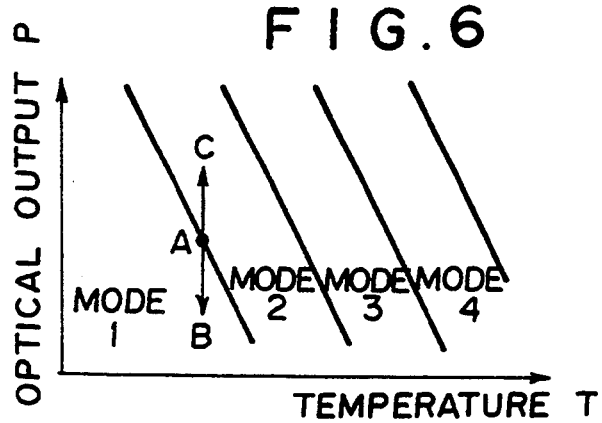
FIG. 6 is a graph showing conditions, under which a longitudinal mode of a semiconductor laser changes over.

FIG. 1 shows a first embodiment of the image scanning apparatus in accordance with the present invention. By way of example, this embodiment is applied to an image recording apparatus. With reference to FIG. 1, an image signal generator 10 generates an image signal S1 representing a continuous tone image. By way of example, the image signal S1 is a digital signal representing a continuous tone image of a density scale of 10 bits. The image signal generator 10 changes over the signal corresponding to a single main scanning line on the basis of a line clock pulse S2, which will be described later. Also, the image signal generator 10 outputs the image signal S1 corresponding to each picture element in accordance with a picture element clock pulse S3.

The image signal S1 is fed into a correction table 11 comprising a RAM, or the like, and subjected to gradation correction, an inverse logarithmic conversion, and a conversion process for eliminating nonlinearity of the optical output characteristics of a semiconductor laser with respect to a drive current. The image signal S1 is thereby converted into a light emission level instructing signal S5 of, for example, 16 bits. The light emission level instructing signal S5 is fed into a D/A converter 12, and is converted by the D/A converter 12 into a light emission level instructing signal Vref, which is composed of an analog voltage signal. The light emission level instructing signal Vref is fed into an addition point 2 of an automatic power control (APC) circuit 8 and then into a voltage-to-current conversion amplifier 3. The voltage-to-current conversion amplifier 3 feeds a drive current, which is proportional to the light emission level instructing signal Vref, into a single-longitudinal-mode semiconductor laser 1. A laser beam 4 is produced by the semiconductor laser 1 and is radiated forwardly. The laser beam 4 is utilized to scan a photosensitive material by a beam scanning system, which will be described later.

A laser beam 5 is radiated rearwardly from the semiconductor laser 1. The intensity of the laser beam 5 is detected by a photodiode 6, which monitors the laser beam intensity and is located in a housing of the semiconductor laser 1. The intensity of the laser beam 5 thus detected is proportional to the intensity of the laser beam 4, which is utilized to record an image. The intensity of the laser beam 5, i.e., the output current of the photodiode 6 representing the intensity of the laser beam 4, is converted by a current-to-voltage conversion amplifier 7 into a feedback signal (a voltage signal) Vpd. The feedback signal Vpd is fed into the addition point 2. From the addition point 2, a deviation signal Ve is fed out which represents the amount of deviation between the light emission level instructing signal Vref and the feedback signal Vpd. The deviation signal Ve is converted by the voltage-to-current conversion amplifier 3 into a current, which drives the semiconductor laser 1.

When control is thus effected, the intensity of the laser beam 5 can be kept at a predetermined value with respect to a predetermined level of the light emission level instructing signal Vref.

The laser beam 4 is collimated by a collimator lens 17, and is then reflected and deflected by a light deflector 18, which may be constituted of a polygon mirror, or the like. The laser beam 4, which has thus been deflected, is passed through a converging lens 19, which may normally be constituted of an fθ lens. The laser beam 4 is thereby converged into a minute spot on a photographic material 20 and caused to scan the photographic material 20 in a main scanning direction indicated by the arrow X. The photographic material 20 is moved by a movement means (not shown) in a subscanning direction indicated by the arrow Y, which direction is approximately normal to the main scanning direction indicated by the arrow X. The photographic material 20 is thus scanned with the laser beam 4 in the sub-scanning direction Y. In this manner, the photographic material 20 is two-dimensionally scanned with and exposed to the laser beam 4. Since the intensity of the laser beam 4 is modulated in accordance with the image signal S1 as mentioned above, the continuous tone image which the image signal S1 represents is recorded as a photographic latent image on the photographic material 20. Thereafter, the photographic material 20 is sent to a developing machine 22 and is subjected to a development process. In this manner, the continuous tone image is developed as a visible image on the photographic material 20.

When the laser beam 4 scans the photographic material 20, passage of the laser beam 4 over a start point of the main scanning is detected by a photodetector 21. A start point detection signal S6 is generated by the photodetector 21 and fed into a clock generator 13. The clock generator 13 outputs the aforesaid line clock pulse S2 and the picture element clock pulse S3 in synchronization with the timing, with which the start point detection signal S6 is fed thereinto.

The direct drive current i for the semiconductor laser 1 is fed out of the voltage-to-current conversion amplifier 3 of the APC circuit 8. A radio-frequency current iR is superimposed upon the drive current i. The radio-frequency current iR is obtained by passing a radio-frequency signal (a voltage signal) RF, which has been fed out of a radio-frequency oscillation circuit 14, through a voltage-to-current conversion amplifier 16. The frequency of the radio-frequency current iR is set at, for example, 20 MHz. If a radio-frequency current having a frequency of 50 MHz or higher is superimposed upon the drive current i, the semiconductor laser 1 will simultaneously oscillate in the multiple longitudinal modes. However, when the radio-frequency current iR described above is superimposed upon the drive current i, the semiconductor laser 1 does not simultaneously oscillate in multiple longitudinal modes. In this embodiment, the single picture element recording period tp is 500 nsec, and the frequency, 20 MHz, of the radio-frequency current iR is 10 times as high as the reciprocal of the single picture element recording period tp. Specifically, in this case, the longitudinal mode of the semiconductor laser 1 changes over 10 times within the single picture element recording period tp.

Figure 10A:
FIGS. 10A, 10B, 10C, 10D, and 10E are graphs showing different examples of the relationships among a main scanning position of reading light in an image read-out apparatus, a longitudinal mode of a semiconductor laser driven with a drive current upon which no radio-frequency current has been superimposed, an amount of reading light produced by the semiconductor laser, a wave form of a radio-frequency current, and a longitudinal mode of the semiconductor laser driven with a drive current upon which the radio-frequency current has been superimposed.
Figure 10:
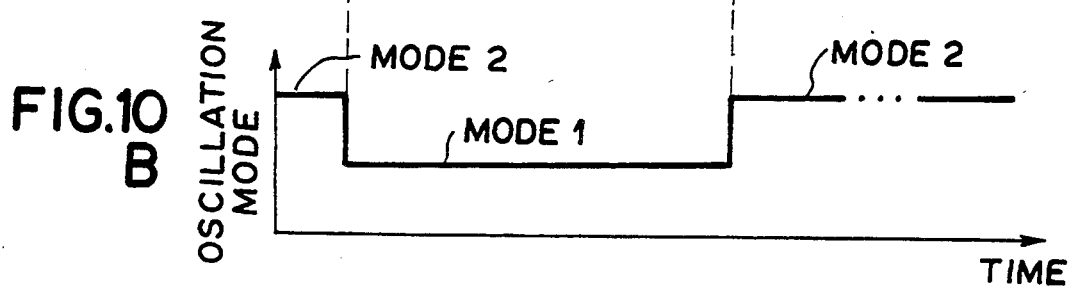
Figure 10:
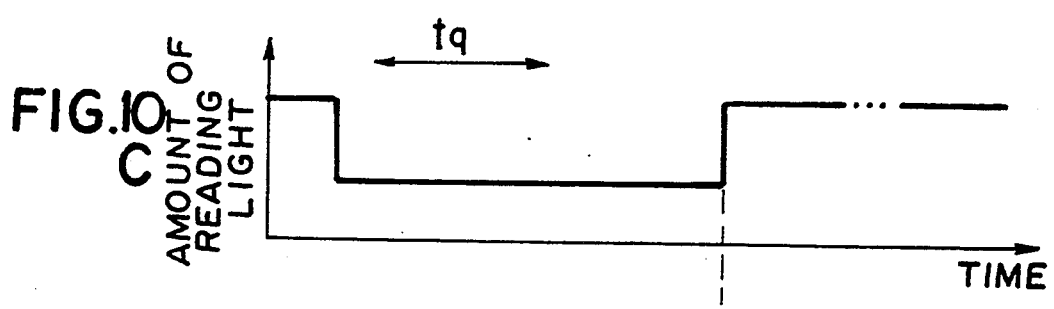
Figure 10:
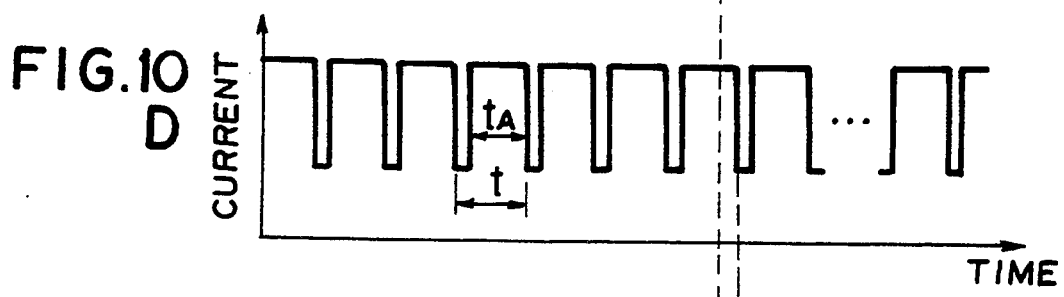
Figure 10:
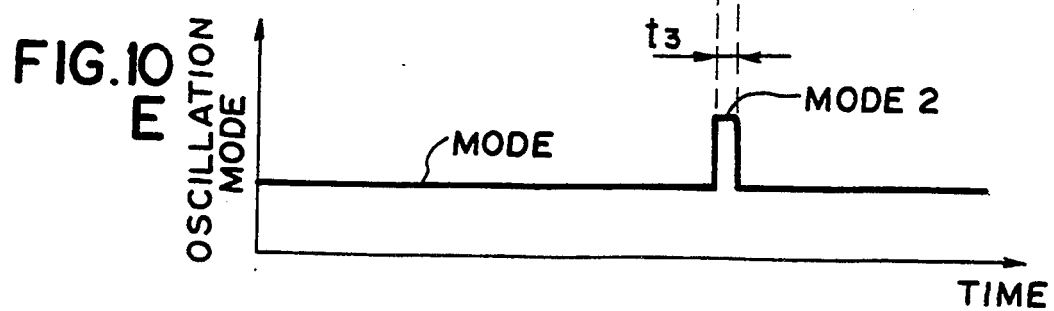
Figure 12A:
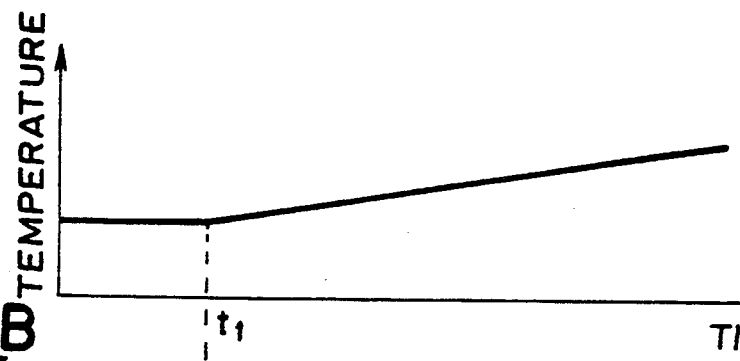
FIGS. 12A, 12B, 12C, 12D, and 12E are graphs showing the relationships among a temperature of a semiconductor laser, an oscillation mode of the semiconductor laser, stimulation energy for a stimulable phosphor sheet, a light emission amount detecting signal, and a picture element clock pulse for sampling an image signal in a conventional radiation image read-out apparatus.
Figure 12B:
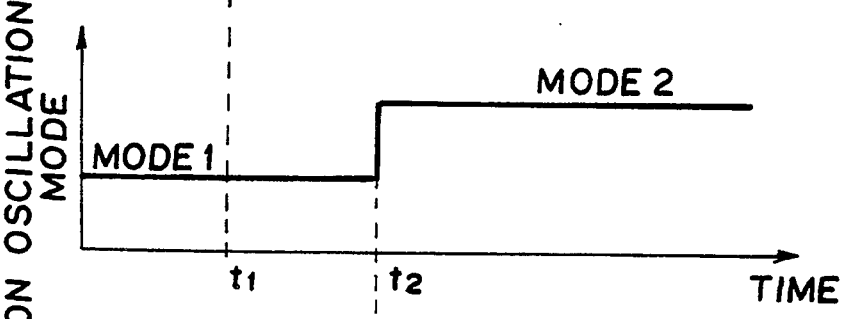
Figure 12C:
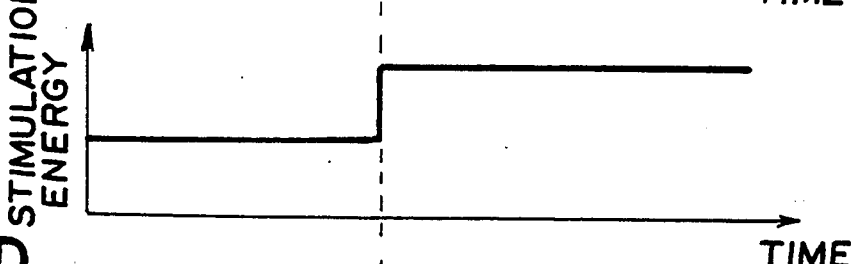
Figure 12D:
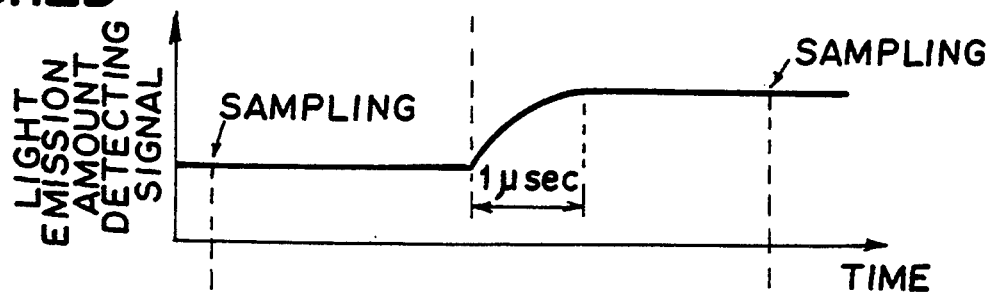
Figure 12E:

As the radio-frequency current iR, for example, a sine-wave current as shown in FIG. 9D or a square-wave current as shown in FIG. 10D is employed.

When the semiconductor laser 1 serving as the recording light source is driven by superimposing the radio-frequency current iR upon the drive current for the semiconductor laser 1, nonuniformity in image density due to the mode hopping phenomenon of the semiconductor laser 1 can be prevented from occurring in an image, which is recorded on the photosensitive material 20. The reasons for this have been described above.

Also, the radio-frequency oscillation circuit 14, which produces the radio-frequency current iR having a frequency of approximately 20 MHz, can be formed at a comparatively low cost. Additionally, radiation noise due to the radio-frequency current iR having the frequency of such a low level can be blocked by comparatively simple electromagnetic shields. Therefore, the cost of this image scanning apparatus can be kept lower than the cost of a conventional image scanning apparatus, wherein a semiconductor laser is caused to simultaneously oscillate in multiple longitudinal modes in order to cope with nonuniformity in image density due to the mode hopping phenomenon.

A second embodiment of the image scanning apparatus in accordance with the present invention will be described hereinbelow with reference to FIG. 11. The second embodiment is constituted as an image read-out apparatus for reading a radiation image from a stimulable phosphor sheet. As illustrated in FIG. 11, this embodiment is provided with a single-longitudinal-mode semiconductor laser 130 serving as a stimulating ray source. A laser beam 131 serving as the stimulating rays is radiated in a divergent state out of the semiconductor laser 130. The laser beam 131 is collimated by a collimator lens 136 and then impinges upon a light deflector 132, such as a rotating polygon mirror. The semiconductor laser 130 is driven by a drive circuit 134.

On a stimulable phosphor sheet 101, a radiation image of an object has been stored by, for example, exposing the stimulable phosphor sheet 101 to radiation, which has passed through the object. The stimulable phosphor sheet 101 is moved by a sub-scanning means 111, which may be constituted of an endless belt, or the like, in the sub-scanning direction indicated by the arrow Y. At the same time, the laser beam 131 is deflected by the light deflector 132, passes through a scanning lens 133, which is ordinarily constituted of an fθ lens, and then scans the stimulable phosphor sheet 101 in the main scanning direction indicated by the arrow X. When the stimulable phosphor sheet 101 is exposed to the laser beam 131, the exposed portion of the stimulable phosphor sheet 101 emits light 113 in an amount proportional to the amount of energy stored thereon during its exposure to the radiation. The emitted light 113 enters a light guide member 114, which is made by forming a transparent acrylic plate, from its one end face 114a. The emitted light 113 is guided inside of the light guide member 114 through repeated total reflection, emanates from a circular end face 114b, and is received by a photomultiplier 115. The photomultiplier 115 generates an analog signal S, which corresponds to the amount of the emitted light 113, i.e. which represents the radiation image stored on the stimulable phosphor sheet 101.

The signal S is logarithmically amplified by a logarithmic amplifier 116 and then fed into an A/D converter 117. In the A/D converter 117, the signal S is sampled in accordance with a predetermined picture element clock pulse and converted into a digital image signal D. The digital image signal D is fed into an image processing circuit 120, in which image processing, such as gradation processing, is carried out on the digital image signal D. The signal obtained from the image processing circuit 120 is fed into an image reproducing apparatus 121 and used during the reproduction of the radiation image as a visible image. The image processing apparatus 121 may be a display means, such as a CRT display device, or a recording apparatus for carrying out the light beam scanning recording on photosensitive film.

How the nonuniformity in image density due to the mode hopping phenomenon of the semiconductor laser 130 is prevented from occurring on the reproduced radiation image will be described hereinbelow. A radio-frequency current iR is fed from a radio-frequency oscillation circuit 135 into the semiconductor laser drive circuit 134 and superimposed upon a drive current I for the semiconductor laser 130. The frequency of the radio-frequency current iR is set at 5 MHz, which is higher than the reciprocal of a single picture element read-out period tq=1 μsec and which falls within the range that does not cause the semiconductor laser 130 to simultaneously oscillate in multiple longitudinal modes.

Figure 7:
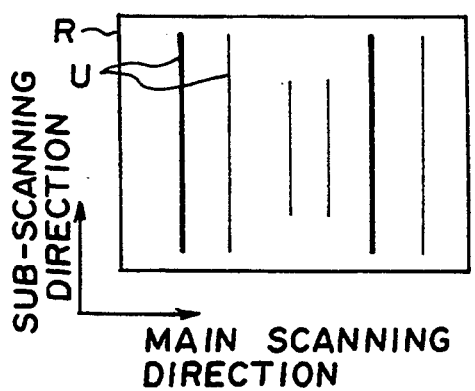
FIG. 7 is an explanatory view showing how nonuniformity in image density occurs in a conventional image read-out apparatus.
Figure 8:
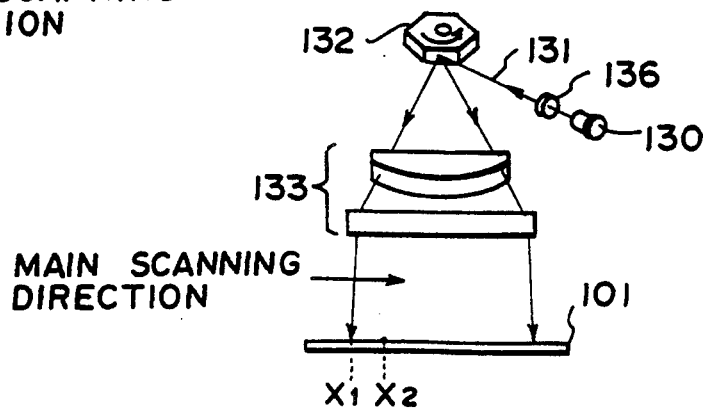
FIG. 8 is a schematic view showing an example of an image read-out apparatus wherein light returns to a semiconductor laser.

When the semiconductor laser 130 serving as the stimulating ray source is driven by superimposing the radio-frequency current iR upon the drive current for the semiconductor laser 130, nonuniformity in image density (in particular, the vertical stripes U shown in FIG. 7) due to the mode hopping phenomenon of the semiconductor laser 130 can be prevented from occurring in the radiation image, which is reproduced by the image reproducing apparatus 121 from the digital image signal D. The reasons for this have been described above.

An embodiment of the radiation image read-out apparatus in accordance with the present invention will be described hereinbelow with reference to FIG. 11.

In this embodiment, in the manner described below, the nonuniformity in image density due to the mode hopping phenomenon of the semiconductor laser 130 is prevented from occurring on the reproduced radiation image. A radio-frequency current iR is fed from the radio-frequency oscillation circuit 135 into the semiconductor laser drive circuit 134 and superimposed upon the drive current I for the semiconductor laser 130. The delay time of the light emission response of the stimulable phosphor sheet 101 employed in this embodiment is approximately 1 μsec. Also, if a radio-frequency current having a frequency of approximately 50 MHz or more is superimposed upon the drive current I, the semiconductor laser 130 will simultaneously oscillate in multiple longitudinal modes. Therefore, in this embodiment, the frequency of the radio-frequency current iR is set at 10 MHz, which is higher than the reciprocal of the delay time of the light emission response and which falls within the range that does not cause the semiconductor laser 130 to simultaneously oscillate in multiple longitudinal modes.

When the semiconductor laser 130 serving as the stimulating ray source is driven by superimposing the radio-frequency current iR upon the drive current for the semiconductor laser 130, nonuniformity in image density due to the mode hopping phenomenon of the semiconductor laser 130 can be prevented from occurring in the radiation image, which is reproduced by the image reproducing apparatus 121 from the digital image signal D. The reasons for this have been described above.

Also, as described above, the radio-frequency oscillation circuit 135 can be formed at a comparatively low cost, and it is sufficient that comparatively simple electromagnetic shields are used to cope with radiation noise. Therefore, the cost of this radiation image read-out apparatus can be kept lower than the cost of a conventional radiation image read-out apparatus, wherein a semiconductor laser is caused to simultaneously oscillate in multiple longitudinal modes in order to cope with nonuniformity in image density due to the mode hopping phenomenon.

What is claimed is:

1. An image scanning apparatus, wherein a recording material is scanned with a laser beam produced by a semiconductor laser operating in a single longitudinal mode at any given time such that an image recorded on the recording material may be read out therefrom or an image may be recorded on the recording material, and a single picture element read-out period or a single picture element recording period is defined in accordance with a predetermined picture element clock pulse, further comprising:

means for superimposing a radio-frequency current on a drive current for the semiconductor laser, said radio-frequency current having a frequency higher than a reciprocal of the single picture element read-out period or a reciprocal of the single picture element recording period and falling within a frequency range of 50 MHz or lower where the semiconductor laser does not simultaneously oscillate in a plurality of modes.

2. An image scanning apparatus as defined in claim 1 wherein said radio-frequency current is a square-wave current having a duty ratio of 60% or more.

3. An image scanning apparatus as defined in claim 1 wherein the recording material is a photographic material.

4. An image scanning apparatus as defined in claim 1 wherein the image is a radiation image.

5. An image scanning apparatus as defined in claim 4 wherein the recording material is a stimulable phosphor sheet, on which the radiation image has been stored.

6. A radiation image read-out apparatus for two-dimensionally scanning a stimulable phosphor sheet, on which a radiation image has been stored, with stimulating rays causing the stimulable phosphor sheet to emit light in proportion to an amount of energy stored thereon during its exposure to radiation, and detecting the emitted light with a photodetector, the radiation image being thereby read out, further comprising:

i) a semiconductor laser which oscillates in a single longitudinal mode at any given time for producing the stimulating rays, and ii) a means for superimposing a radio-frequency current upon a drive current for said semiconductor laser, said radio-frequency current having a frequency higher than a reciprocal of a delay time of light emission response of the stimulable phosphor sheet and falling within a frequency range of 50 MHz or lower where the semiconductor laser does not simultaneously oscillate in a plurality of modes.

* * * * *